US 6,572,177 B2

(12) United States Patent
Griffis

(10) Patent No.: US 6,572,177 B2
(45) Date of Patent: Jun. 3, 2003

(54) COVER FOR FLEXIBLE SIGNAL CONNECTION FOR A TRANSIT VEHICLE DOOR

(75) Inventor: David C. Griffis, Chicago, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/772,230

(22) Filed: Jan. 29, 2001

(65) Prior Publication Data

US 2002/0101094 A1 Aug. 1, 2002

(51) Int. Cl.[7] .................................................. B60J 5/00
(52) U.S. Cl. ..................................................... 296/146.4
(58) Field of Search ............................. 296/208, 146.1, 296/146.11–146.12, 146.4; 174/99 E

(56) References Cited

U.S. PATENT DOCUMENTS 3,792,189 A * 2/1974 Stengel et al. ................. 174/69
3,848,361 A * 11/1974 Foster et al. ................... 49/167
5,039,828 A * 8/1991 Marks et al. ............... 49/167 X
5,332,279 A * 7/1994 Golemis et al. ........... 296/146.4
5,466,036 A * 11/1995 Stroeters et al. ............ 296/208

* cited by examiner

Primary Examiner—Dennis H. Pedder
(74) Attorney, Agent, or Firm—James Ray and Associates

(57) ABSTRACT

A cover system for at least one flexible signal connection in a door system for a transit vehicle having at least one door panel mounted to open and close by rotation about an axis. The cover system includes an outer cover for the flexible signal connection(s), the outer cover being for attachment to either a stationary portion of the transit vehicle door system or one of the door panels. The outer cover encloses a first passage. The cover system also has an inner cover for the flexible signal connection(s), the inner cover being for attachment to the opposite one of the stationary portion of the transit vehicle door system and a door panel. The inner cover is positionable within the first passage while the door panel rotates about the axis between an open position and a closed position of the door panel. The inner cover has a second passage therein, the second passage being for the flexible signal connection(s).

14 Claims, 7 Drawing Sheets

COVER FOR FLEXIBLE SIGNAL CONNECTION FOR A TRANSIT VEHICLE DOOR

FIELD OF THE INVENTION

The present invention relates, in general, to transit vehicle door systems and, more particularly, the instant invention relates to covers for signal connections in transit vehicle door systems.

BACKGROUND OF THE INVENTION

Some transit vehicle door systems require signal connections between moveable door panels and stationary portions of the door systems. These signal connections may be, for example, electrical wires, or may be pneumatic tubes. Wires may be employed in electrical edge sensors for detecting an impact with a passenger or other obstruction, for safety lights, etc. Pneumatic tubes may be employed for convening an air pressure signal from a pneumatic door edge sensor to an air pressure sensor.

For the case of transit vehicle door systems in which the doors rotate between open and closed positions, such signal connections may be provided with some protection by a flexible piece of tubing which is placed over the connections where the connections pass from the door panel to the stationary portion of the door system. Breakage of such signal connections is a common maintenance problem in such door systems. Breakage may be caused by an object carried by a passenger catching on the signal connections, by vandalism, or by fatigue due to repeated movement between open and closed positions of the door. Gravity, tending to bend slack signal connections downward, contributes to fatigue.

SUMMARY OF THE INVENTION

In one aspect, the present invention is a cover system for at least one flexible signal connection in a door system for a transit vehicle, the door system including at least one door panel mounted to open and close by rotation about an axis. The cover system includes an outer cover for the flexible signal connection(s), the outer cover being for attachment to either a stationary portion of the transit vehicle door system or one of the door panels. The outer cover encloses a first passage. The cover system also has an inner cover for the flexible signal connection(s), the inner cover being for attachment to the opposite one of the stationary portion of the transit vehicle door system and the door panel. The inner cover is positionable within the first passage while the door panel rotates about the axis between an open position and a closed position of the door panel. The inner cover has a second passage therein, the second passage being for the flexible signal connection(s).

In another aspect, the present invention is a door system for a transit vehicle. It includes a stationary portion for attachment to the transit vehicle, at least one door panel mounted on the stationary portion to be moved between an open position and a closed position by rotation about an axis, and at least one flexible signal connection passing from the stationary portion of the door system to the door panel. There is also a cover system for the flexible signal connection(s), the cover system including an outer cover for the flexible signal connection(s), the outer cover attached to the stationary portion of the door system. The outer cover encloses a first passage. The cover system also includes an inner cover for the flexible signal connection(s). The inner cover is attached to the door panel, and is positioned to slide within the first passage in the outer cover as the door panel is moved between an open position and a closed position of the door panel. The inner cover encloses a second passage, the second passage being for the flexible signal connection(s).

OBJECTS OF THE INVENTION

It is therefore one of the primary objects of the present invention to provide a cover for flexible signal connections in a transit vehicle door system.

Another object of the present invention is to provide a cover for electric wires connected between stationary portions of a transit vehicle door system and moveable door panels.

Still another object of the present invention is to provide a cover for pneumatic tubes connected between stationary portions of a transit vehicle door system and moveable door panels.

Yet another object of the present invention is to protect flexible signal connections in a transit vehicle door system from inadvertent damage due to being caught on objects carried by passengers.

A further object of the present invention is to protect flexible signal connections in a transit vehicle door system from damage due to vandalism.

It is an additional object of the present invention to support flexible signal connections in a transit vehicle door system to reduce flexure due to gravity.

Another object of the present invention is to hide unsightly flexible signal connections to a door panel in a transit vehicle door system.

It is a further object of the present invention to provide a cover for flexible signal connections which is easy to install.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
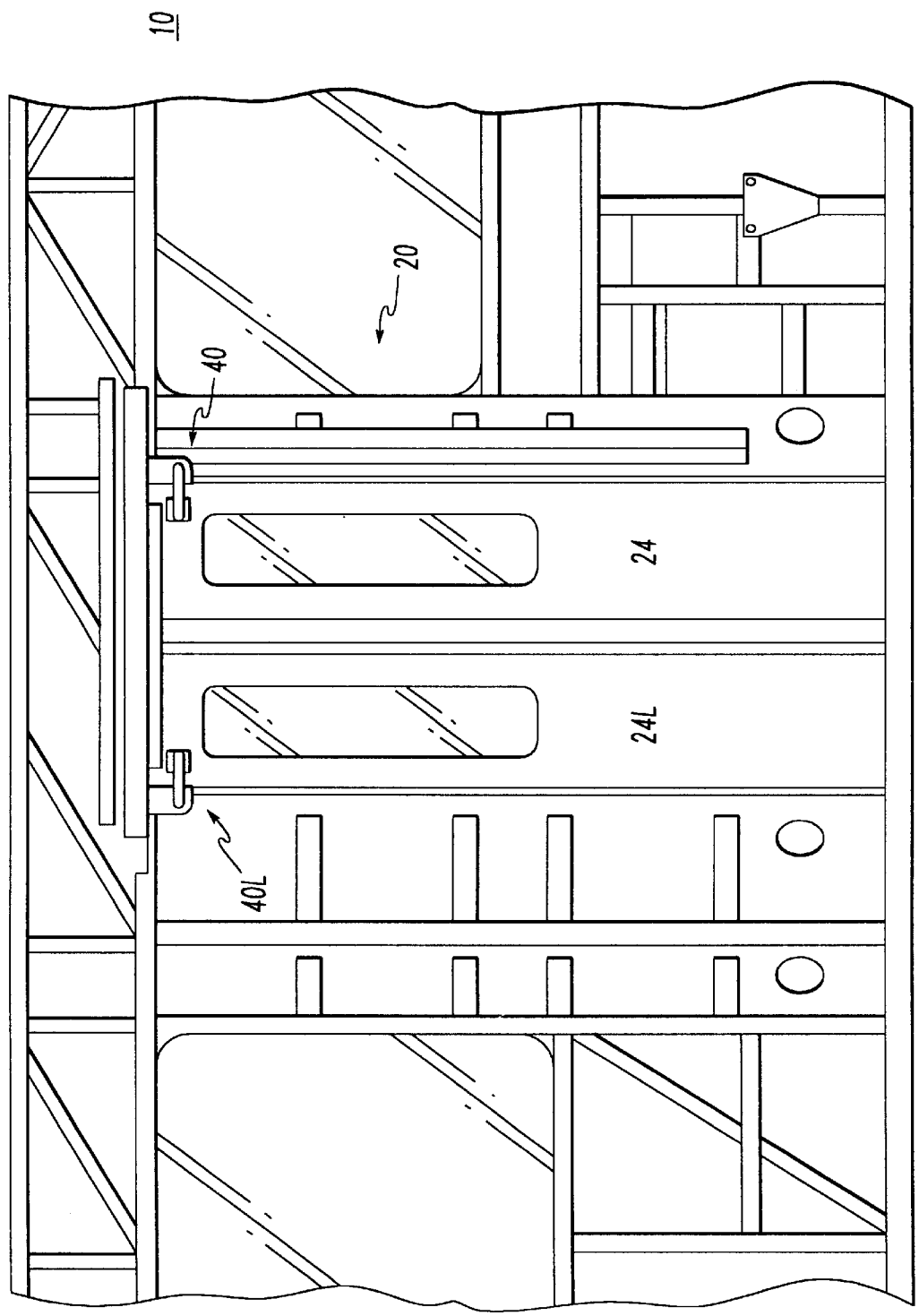
FIG. 1 is a view from inside a transit vehicle showing a pair of biparting door panels having signal connection covers according to the present invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Figure 2:
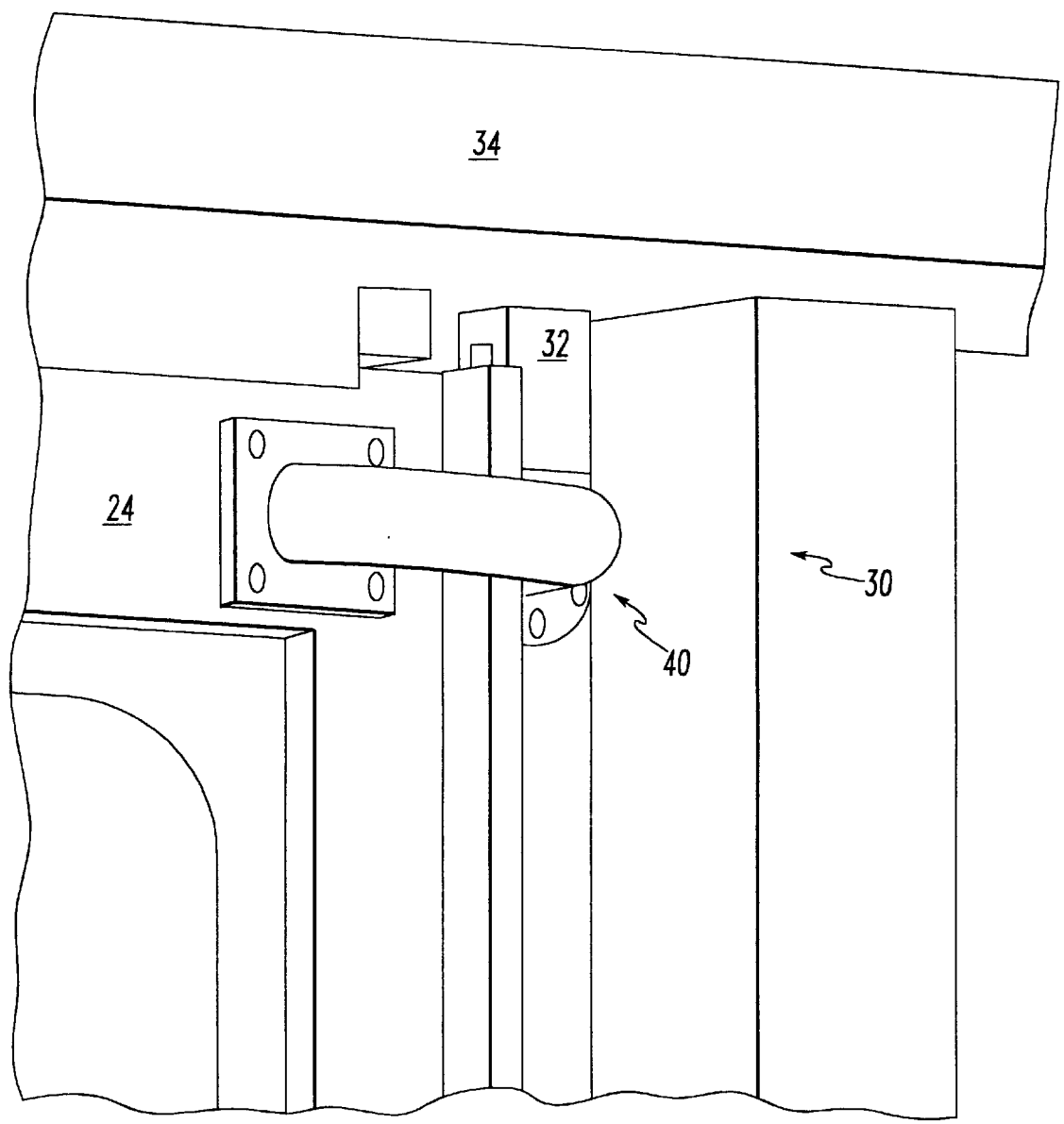
FIG. 2 is close-up of the cover for the signal connections on the right door panel.

Attention is now directed to FIGS. 1 and 2, which illustrate a transit vehicle, generally designated 10, having a door system, generally designated 20. Door system 20 includes right door panel 24 and left door panel 24L. Door system 20 also includes a stationary portion, generally designated 30, having a door frame member 32 and overhead door operator 34. Flexible signal connection 22 shown in FIGS. 10, 11 and 12, passes from stationary portion 30 of door system 20 to door panel 24, and a similar flexible signal connection (not shown) passes from stationary portion 30 of door system 20 to door panel 24L. The invention provides a cover system, generally designated 40, for covering flexible signal connection 22 to the right door panel 24 and a cover system 40L for covering a similar signal connection to the left door panel 24L. Cover system 40L is mirror symmetric with cover system 40 and will therefore not be described in detail.

Figure 3:
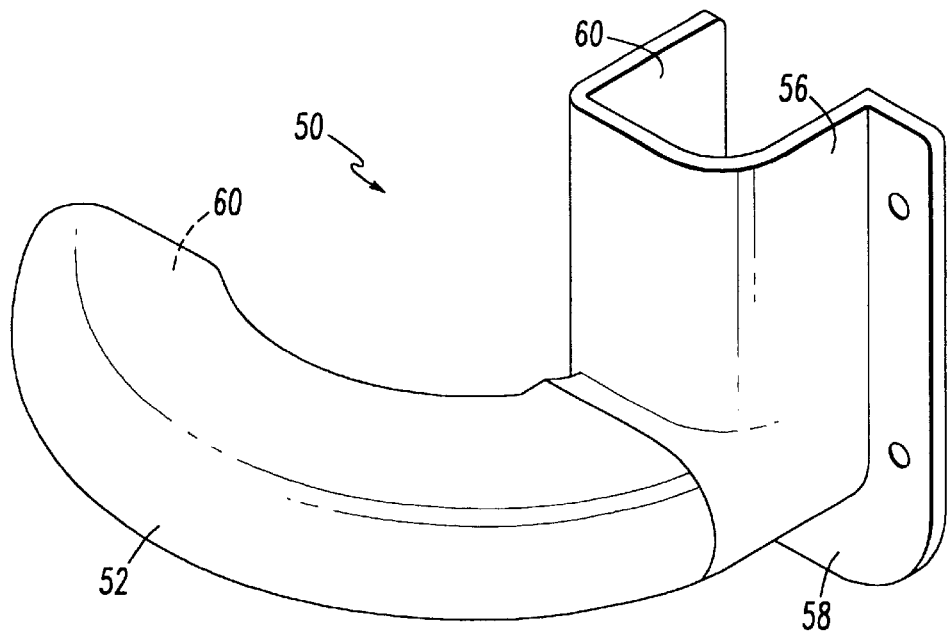
FIG. 3 is an isometric view of an outer cover which is for attachment to stationary portions of the door system or vehicle, and is for signal connections on the right door panel.
Figure 4:
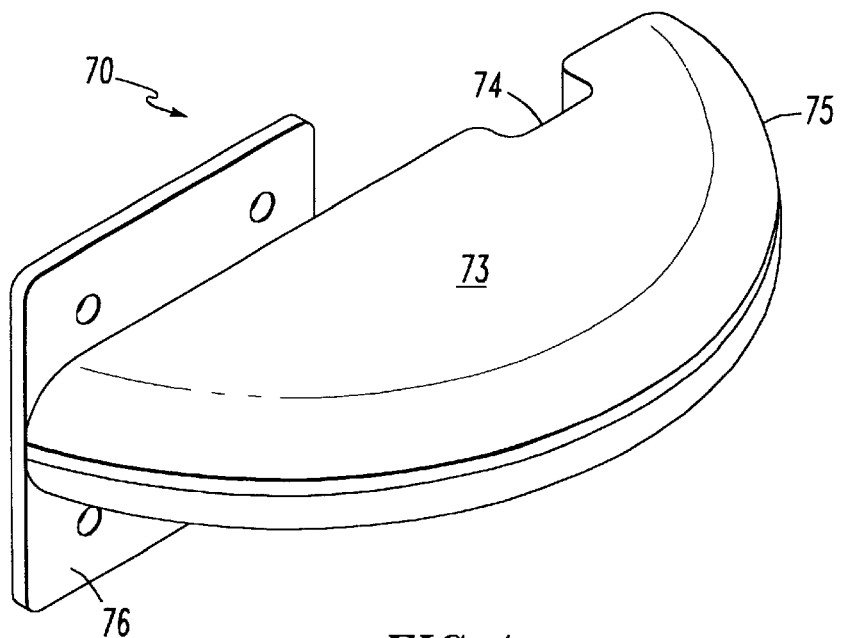
FIG. 4 is an isometric view of an inner cover which slides inside the outer cover and which is for attachment to the right door panel.

Cover system 40 includes an outer cover, generally designated 50, which is illustrated in FIG. 3 and an inner cover, generally designated 70, which is illustrated in FIG. 4. Preferably, outer cover 50 is attached to stationary portion 30 of transit vehicle door system 20. Preferably, outer cover 50 is attached to frame member 32 of stationary portion 30 by flange 58. Outer cover 50, preferably, has a linear portion 56 and an arcuate portion 52. Outer cover 50 encloses a first passage, generally designated 60.

Inner cover 70 is, preferably, attached to door panel 24 by flange 76, and it fits inside first passage 60 in outer cover 50. It is preferred that cover system 40 be entirely disposed within transit vehicle 10 when right door panel 24 is closed, as illustrated in FIGS. 1 and 2. Preferably, inner cover 70 has a pair of semi circular surface members 73, connected by bridge portion 74.

For the left door panel, 24L, a similar cover system would preferably have an outer cover which would be the mirror image of outer cover 50 illustrated in FIG. 3. Preferably, inner cover 70 is symmetrical so it can be oriented to be used for either cover system 40 for the right door, or cover system 40L for the left door.

Figure 5:
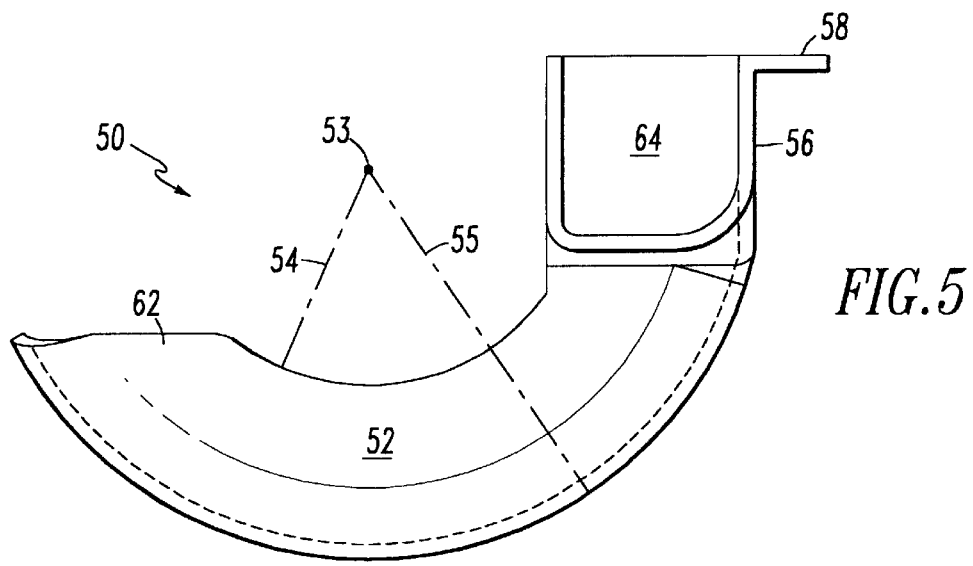
FIG. 5 is a top view of the outer cover for the right door panel.
Figure 6:
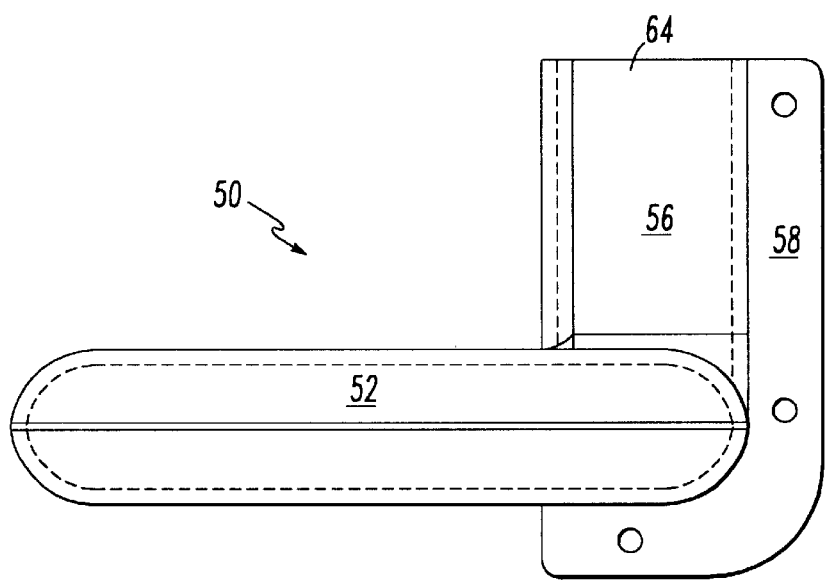
FIG. 6 is a front view of the outer cover for the right door panel, viewed from inside the vehicle.
Figure 7:
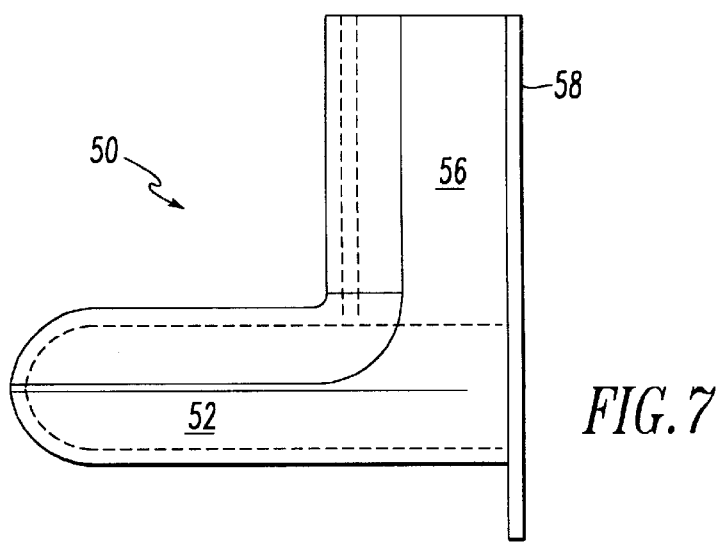
FIG. 7 is a side view of the outer cover for the right door panel viewed from the right.

Additional detail of outer cover 50 is provided by FIGS. 5 and 6. FIG. 6 shows the outer cover 50 from inside transit vehicle 10 and FIG. 5 shows outer cover 50 from above. Linear portion 56 of outer cover 50 encloses linear portion 64 of first passage 60. Arcuate portion 52 encloses arcuate portion 62 of first passage 60. An inner radius 54 of arcuate portion 52, taken from center of curvature 53 and an outer radius 55 of arcuate portion 52 are illustrated in FIG. 5. A view of outer cover 50, taken from the right, is shown in FIG. 7.

Figure 8:
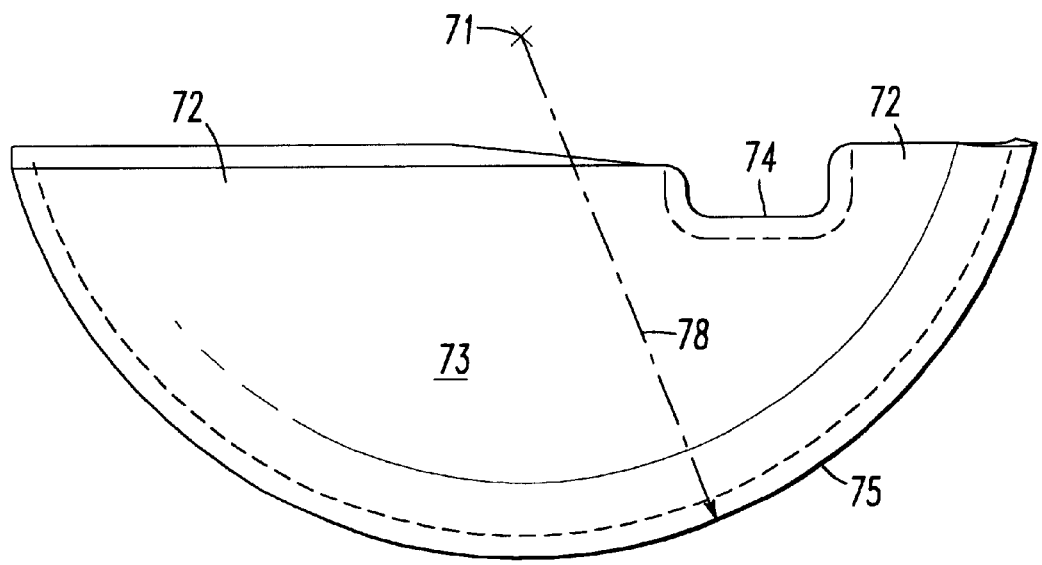
FIG. 8 is a top view of the inner cover oriented for the right door panel, taken from above the view shown in FIG. 4.
Figure 9:
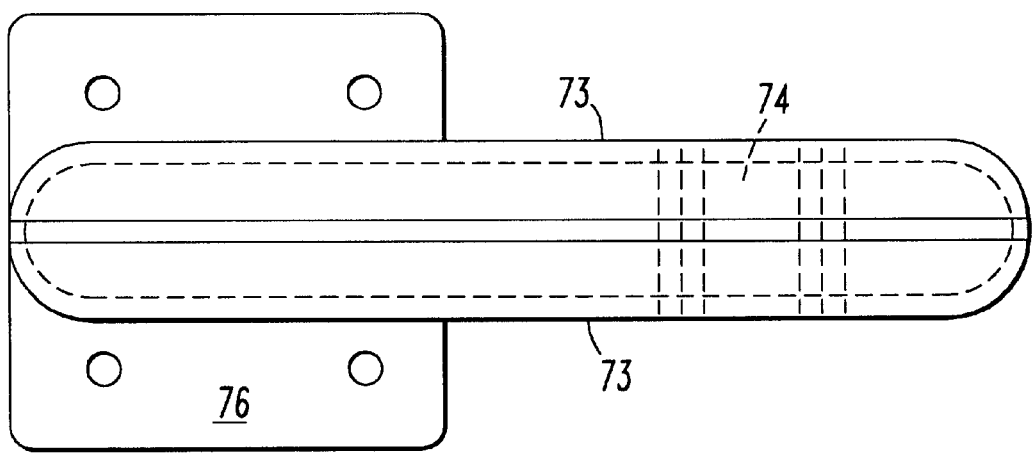
FIG. 9 is a front view of the inner cover oriented for the right door panel.

Additional detail of inner cover 70 is provided by FIGS. 8 and 9. FIG. 9 shows inner cover 70 without outer cover 50 from inside transit vehicle 10. FIG. 8 shows inner cover 70 from above. Semi circular surface members 73 connected by bridge 74 are illustrated in these figures. Also a curved exterior 75 of inner cover 70 is shown. Curved exterior 75 has a radius of curvature 78 from center of curvature 71. Second passage 72 is enclosed by curved exterior 75, semi circular surface members 73 and bridge 74. When inner cover 70 is assembled with outer cover 50, center of curvature 71 of inner cover is substantially coincident with center of curvature 53 of outer cover 50.

Figure 10:
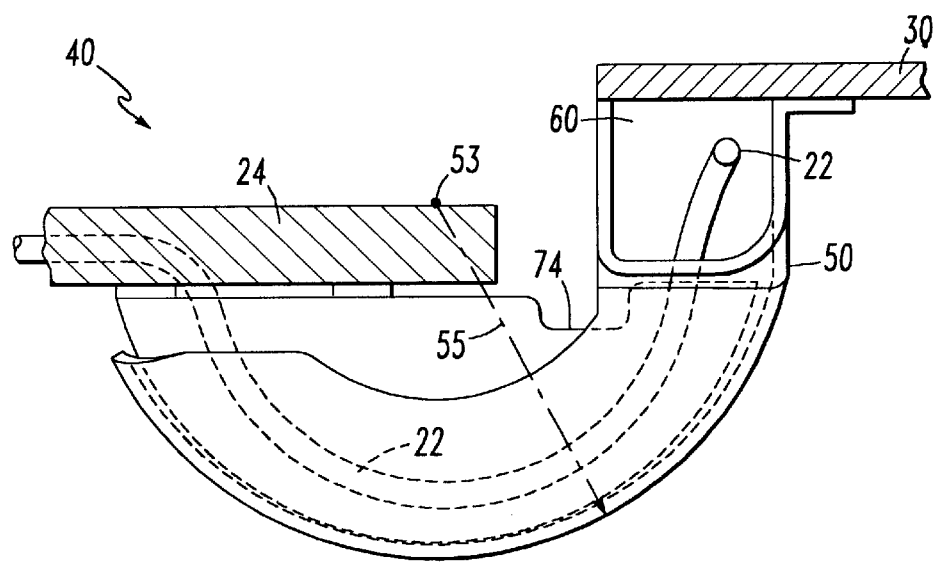
FIG. 10 is a top view of the inner cover and outer cover assembled for the right door panel and a flexible signal connection, the right door panel being closed.
Figure 11:
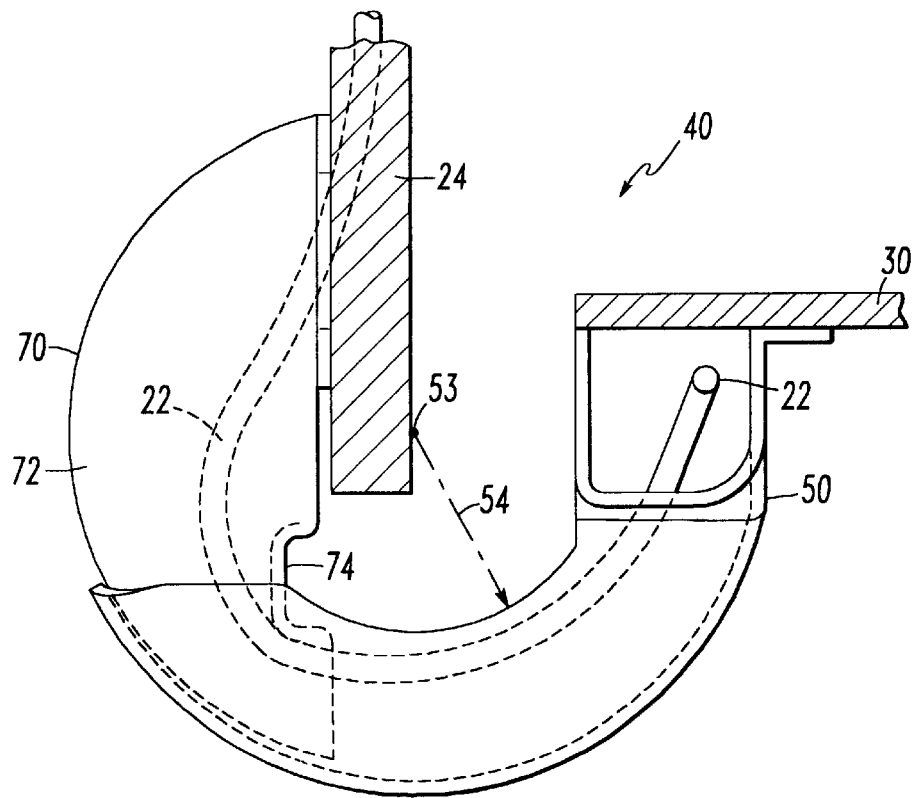
FIG. 11 is a view similar to that shown in FIG. 10 except that the right door panel is in its open position.

FIGS. 10 and 11 illustrate the cover system 40 with the outer cover 50 attached to stationary portion 30 of door system 20. FIG. 10 shows the cover system 40 when right door panel 24 is closed and FIG. 12 shows the cover system 40 when right door panel 24 is open.

Inner cover 70 is partially disposed within outer cover 50 and is attached to door panel 24. The flexible signal connection 22 is shown, enclosed by first passage 60 and second passage 72. Bridge 74 serves to secure flexible signal connection 22 within second passage 72. FIGS. 10 and 11 illustrate radial movement of flexible signal connection 22 between the closed position of FIG. 10 and the open position of FIG. 11. In FIG. 10, flexible signal connection 22 is positioned near outer radius 55 of outer cover 50 and moves inward toward inner radius 54 of outer cover 50 as door panel 24 is opened.

Figure 12:
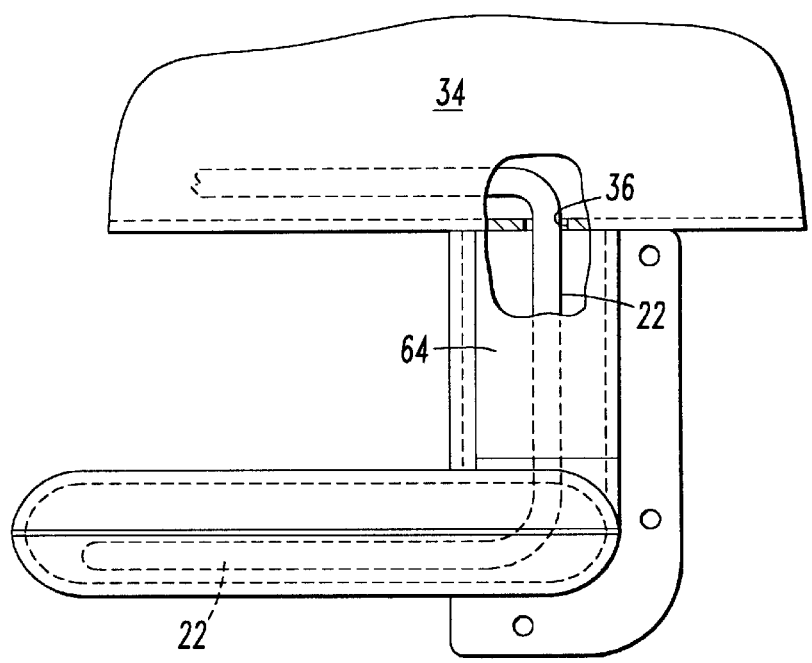
FIG. 12 is a view of the cover system installed, and the flexible signal connections passing through a linear portion of the outer cover to an overhead door operator.

FIG. 12 illustrates the flexible signal connection 22 passing through linear portion 64 of first passage 60 and through opening 36 into overhead door operator 34, which is included in the stationary portion 30 of door system 20.

Figure 13:
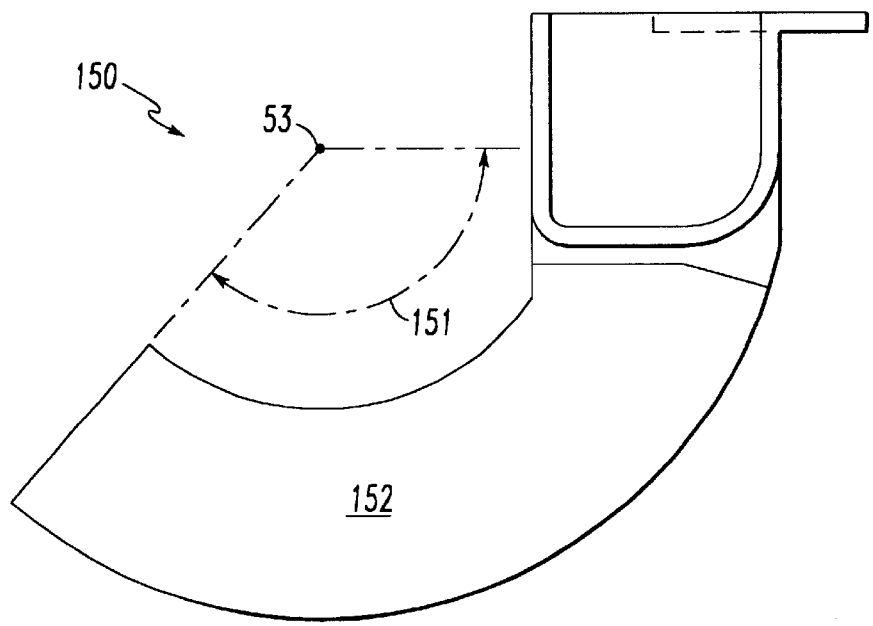
FIG. 13 is a view of an outer cover in which the arcuate portion has an angular extent of about 135 degrees.

FIG. 13 illustrates an alternative embodiment for an outer cover 150 in which arcuate portion 152 has an angular extent 151 of about 135 degrees.

While a presently preferred and an alternative embodiment of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A cover system for at least one flexible signal connection in a door system for a transit vehicle, such door system including at least one door panel mounted to open and close by rotation about an axis, said cover system comprising:

(a) an outer cover having a first passage formed therein slidably disposed over at least a portion of such at least one flexible signal connection, said outer cover including a flange means disposed at one end thereof which is engageable with at least one of a stationary portion of such transit vehicle door system and such at least one door panel for securing said outer cover to such at least one of such stationary portion of such transit vehicle door system and such at least one door panel, said outer cover being disposed in a substantially horizontal position;

an inner cover having a second passage formed therein slidable disposed over said at least a portion of such at least one flexible signal connection, said inner cover being engageable in a substantially horizontal position with an opposite one of such stationary portion of such transit vehicle door system and such at least one door panel, said inner cover being positionable within said first passage while such at least one door panel rotates about said axis between an open position and a closed position of such at least one door panel.

2. A cover system, according to claim 1, wherein said outer cover has an arcuate portion and said first passage has an arcuate portion, said arcuate portion of said first passage being enclosed by said arcuate portion of said outer cover.

3. A cover system, according to claim 1, wherein said inner cover has at least one flange engageable with an opposite one of such stationary portion of such transit vehicle door system and such at least one door panel.

4. A cover system, according to claim 1, wherein said outer cover has a linear portion and said first passage has a linear portion, said linear portion of said first passage being enclosed by said linear portion of said outer cover.

5. A cover system, according to claim 1, wherein said outer cover has at least one flange engageable with said at least one of such stationary portion of such transit vehicle door system and such at least one door panel.

6. A cover system, according to claim 4, wherein said at least one flange is disposed on said linear portion of said outer cover.

7. A cover system, according to claim 2, wherein said inner cover has a curved exterior to fit within said arcuate portion of said first passage in said outer cover.

8. A cover system, according to claim 7, wherein said inner cover has a substantially semi-discoidal form.

9. A cover system, according to claim 8, wherein said inner cover includes a pair of substantially semi-circular surface members.

10. A cover system, according to claim 9, wherein said inner cover has a bridge portion connecting said pair of substantially semi-circular surface members, said bridge portion confining such at least one flexible signal connection with said second passage.

11. A door system for a transit vehicle, said door system comprising:

a stationary portion for attachment to such transit vehicle;

at least one door panel mounted on said stationary portion to be moved between an open position and a closed position by rotation about an axis, at least one flexible signal connection passing from said stationary portion of said door system to said at least one door panel;

a horizontally disposed cover system for said at least one flexible signal connection, said cover system having:

an outer cover for said at least one flexible signal connection, said outer cover attached to said stationary portion of said door system, said outer cover having a first passage therein, said outer cover further includes an arcuate portion enclosing an arcuate portion of said first passage and a linear portion enclosing a linear portion of said first passage;

an inner cover for said at least one flexible signal connection, said inner cover attached to said at least one door panel, said inner cover being positioned to slide within said first passage in said outer cover as said at least one door panel is moved between an open position and a closed position of said at least one door panel, said inner cover having a second passage therein for said at least one flexible signal connection.

12. A door system, according to claim 11, wherein said door system includes an overhead door operator disposed above said at least one door panel and said at least one flexible signal connection passes from said overhead door operator to said at least one door panel.

13. A door system, according to claim 12, wherein said linear portion of said cover system is oriented vertically whereby said linear portion of said first passage communicates with an opening in said overhead door operator.

14. A door system, according to claim 11, wherein said cover system is attached to inside surfaces of both said stationary portion and said door panel.

\* \* \* \* \*